US010513039B2

United States Patent
Sugiyama et al.

(10) Patent No.: US 10,513,039 B2
(45) Date of Patent: Dec. 24, 2019

(54) TEACH PENDANT AND ROBOT SYSTEM PROVIDED WITH THE SAME

(71) Applicant: FANUC CORPORATION, Yamanashi (JP)

(72) Inventors: Yuusuke Sugiyama, Yamanashi (JP); Shougo Takahashi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 99 days.

(21) Appl. No.: 15/838,563

(22) Filed: Dec. 12, 2017

(65) Prior Publication Data
US 2018/0169859 A1 Jun. 21, 2018

(30) Foreign Application Priority Data

Dec. 16, 2016 (JP) .................................. 2016-244416

(51) Int. Cl.
*B25J 13/06* (2006.01)
*G05B 19/409* (2006.01)
*B25J 9/16* (2006.01)

(52) U.S. Cl.
CPC .............. *B25J 13/06* (2013.01); *B25J 9/1638* (2013.01); *G05B 19/409* (2013.01); *G05B 2219/39176* (2013.01); *G05B 2219/39438* (2013.01); *G05B 2219/39443* (2013.01); *G05B 2219/39444* (2013.01); *G05B 2219/39446* (2013.01)

(58) Field of Classification Search
CPC .................. B25J 13/06; G05B 19/409; G05B 2216/39438; G05B 2216/39446; G05B 2216/39444; G05B 2216/39443
See application file for complete search history.

(56) References Cited

U.S. PATENT DOCUMENTS 6,212,443 B1    4/2001  Nagata et al.
2002/0173878 A1  11/2002  Watanabe et al.
(Continued)

FOREIGN PATENT DOCUMENTS

CN    103659806 A    3/2004
CN      1677301 A   10/2005
(Continued)

OTHER PUBLICATIONS

Japanese Office Action dated Jul. 31, 2018, for Japanese Patent Application No. 2016-244416.
(Continued)

*Primary Examiner* — Spencer D Patton
(74) *Attorney, Agent, or Firm* — Karceski IP Law, PLLC

(57) ABSTRACT

A teach pendant includes an input unit and allowing teaching of operation of a robot by an input to the input unit, the teach pendant further includes a measurement reference surface which comes into surface contact with a measured surface of the robot, a tilt sensor whose position is fixed with respect to the measurement reference surface, and an output means which outputs a detection value of the tilt sensor to a control device of the robot in a state where the measurement reference surface is in surface contact with the measured surface and when a predetermined input operation is performed on the input unit or a contact detection sensor for detecting surface contact between the measurement reference surface and the measured surface detects the surface contact.

9 Claims, 12 Drawing Sheets

(56) References Cited

U.S. PATENT DOCUMENTS

| | | |
|---|---|---|
| 2005/0231332 A1 | 10/2005 | Nihei et al. |
| 2005/0240309 A1 | 10/2005 | Bischoff |
| 2013/0197695 A1 | 8/2013 | Yi et al. |
| 2016/0297076 A1 | 10/2016 | Reidel |
| 2018/0071913 A1* | 3/2018 | Matsudaira .............. B25J 13/06 |

FOREIGN PATENT DOCUMENTS

| | | |
|---|---|---|
| CN | 200963770 Y | 10/2007 |
| CN | 103659806 A | 3/2014 |
| CN | 205219117 U | 5/2016 |
| DE | 69622572 T2 | 4/2003 |
| DE | 102004020099 A1 | 11/2005 |
| DE | 102007029335 A1 | 1/2009 |
| DE | 102015206578 B3 | 8/2016 |
| DE | 102015206575 A1 | 10/2016 |
| EP | 1250986 A2 | 10/2002 |
| EP | 1582956 A2 | 10/2005 |
| EP | 2324967 A2 | 5/2011 |
| JP | H05-310400 A | 11/1993 |
| JP | 2002-192489 A | 7/2002 |
| JP | 2002307344 | 10/2002 |
| JP | 2005288581 | 10/2005 |
| JP | 2006-305658 A | 11/2006 |
| JP | 2016-060018 A | 4/2016 |
| JP | 2016-17532 A | 10/2016 |
| JP | 2016-175132 A | 10/2016 |
| WO | 2015166738 A1 | 11/2015 |

OTHER PUBLICATIONS

Japanese Search Report by Registered Search Agency dated Jul. 31, 2018, for Japanese Patent Application No. 2016-244416.
Chinese Office Action dated Jun. 3, 2019, for Chinese Patent Application No. 201711337813.X.
German Office Action dated Mar. 14, 2019, for German Patent Application No. 102017222706.0.

* cited by examiner

TEACH PENDANT AND ROBOT SYSTEM PROVIDED WITH THE SAME

CROSS-REFERENCE TO RELATED APPLICATION

This application is based on and claims priority to Japanese Patent Application No. 2016-244416 filed on Dec. 16, 2016, the entire content of which is incorporated herein by reference.

FIELD OF THE INVENTION

The present invention relates to a teach pendant and a robot system provided with the same.

BACKGROUND OF THE INVENTION

As this type of robot system, there is known a system in which, in order to correct the position or the posture of a tip of an articulated robot, a robot control device calculates a deflection occurring at each joint and each link by Newton-Euler method or the like, and then, calculates a deflection of the position or the posture of the tip of the robot from a target position based on the determined deflection, and controls operation of each joint so as to correct the deflection (for example, see Japanese Unexamined Patent Application, Publication No. 2002-307344).

There is also known a robot system which aims to prevent contact between a robot and an operator or to reduce a force that is received by the operator at the time of contact with the robot, by using a detection value of a force sensor accommodated in a base portion of the robot (for example, see European Patent Application, Publication No. 2324967).

SUMMARY OF THE INVENTION

A teach pendant according to a first aspect of the present invention is a teach pendant including an input unit and allowing teaching of operation of a robot by an input to the input unit, the teach pendant including a measurement reference surface which comes into surface contact with a measured surface of the robot; a tilt sensor whose position is fixed with respect to the measurement reference surface; and a teach pendant controller, wherein the teach pendant controller is configured to output a detection value of the tilt sensor or data based on the detection value to a control device of the robot in a state where the measurement reference surface is in surface contact with the measured surface and when a predetermined input is performed on the input unit or a contact detection sensor for detecting the surface contact between the measurement reference surface and the measured surface detects the surface contact.

A teach pendant according to a second aspect of the present invention is a teach pendant including an input unit and allowing teaching of operation of a robot by an input to the input unit, the teach pendant including a plurality of measurement reference protrusions which come into contact with a measured surface of the robot; a tilt sensor whose position is fixed with respect to the plurality of measurement reference protrusions; and a teach pendant controller, wherein the teach pendant controller is configured to output a detection value of the tilt sensor or data based on the detection value to a control device of the robot in a state where the plurality of measurement reference protrusions are in contact with the measured surface and when a predetermined input is performed on the input unit or a contact detection sensor for detecting the contact between the plurality of measurement reference protrusions and the measured surface detects the contact.

DESCRIPTION OF EMBODIMENT(S) OF THE INVENTION

A robot system according to a first embodiment of the present invention will be described below with reference to the drawings.

Figure 1:
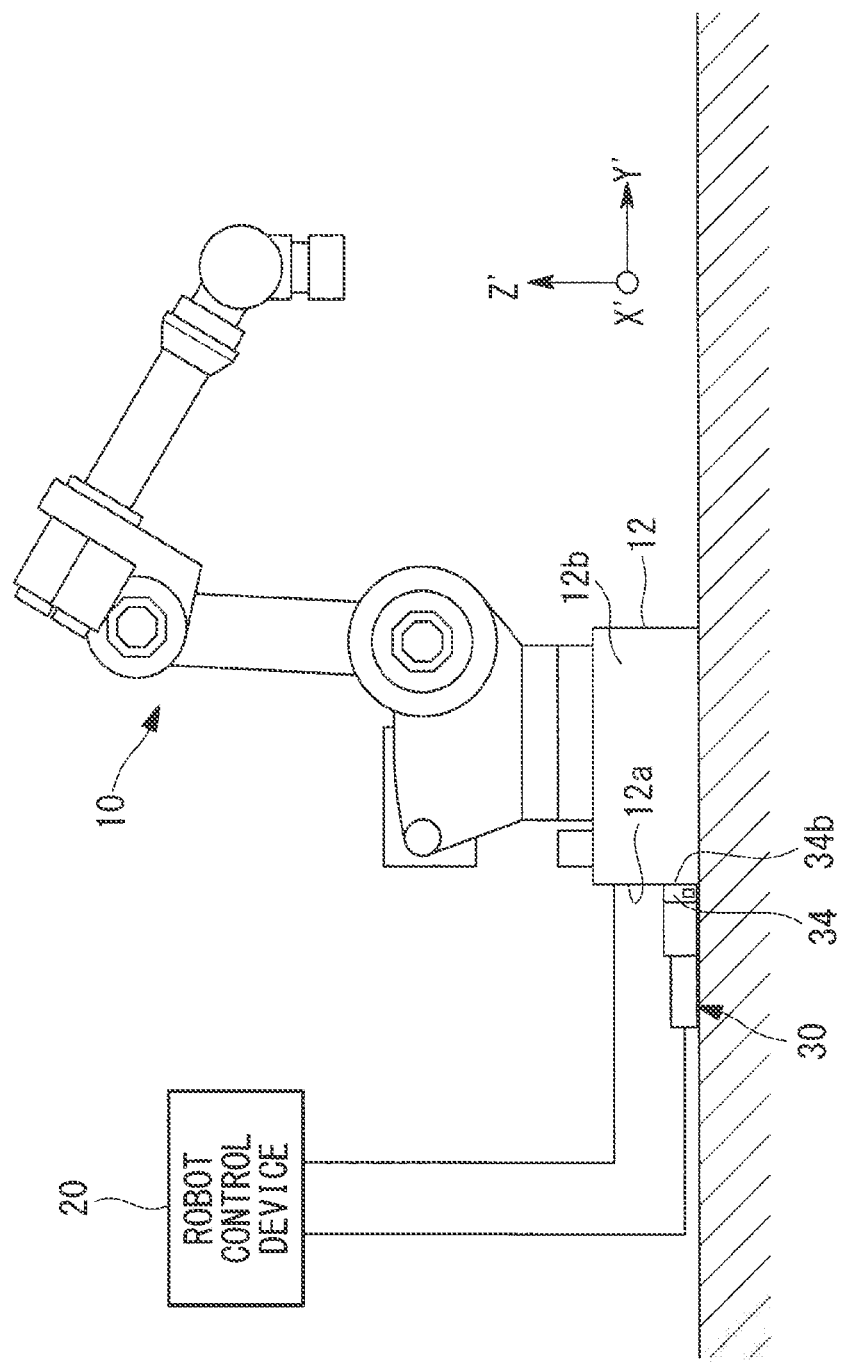
FIG. 1 is a schematic side view of a robot system according to a first embodiment of the present invention.

As shown in FIG. 1, the robot system includes a robot 10, a robot control device 20 which is connected to the robot 10 and which controls the robot 10, and a teach pendant 30 which is connected to the robot control device 20 and which can be carried by an operator. The teach pendant 30 may be configured to be able to wirelessly communicate with the robot control device 20.

Figure 2:
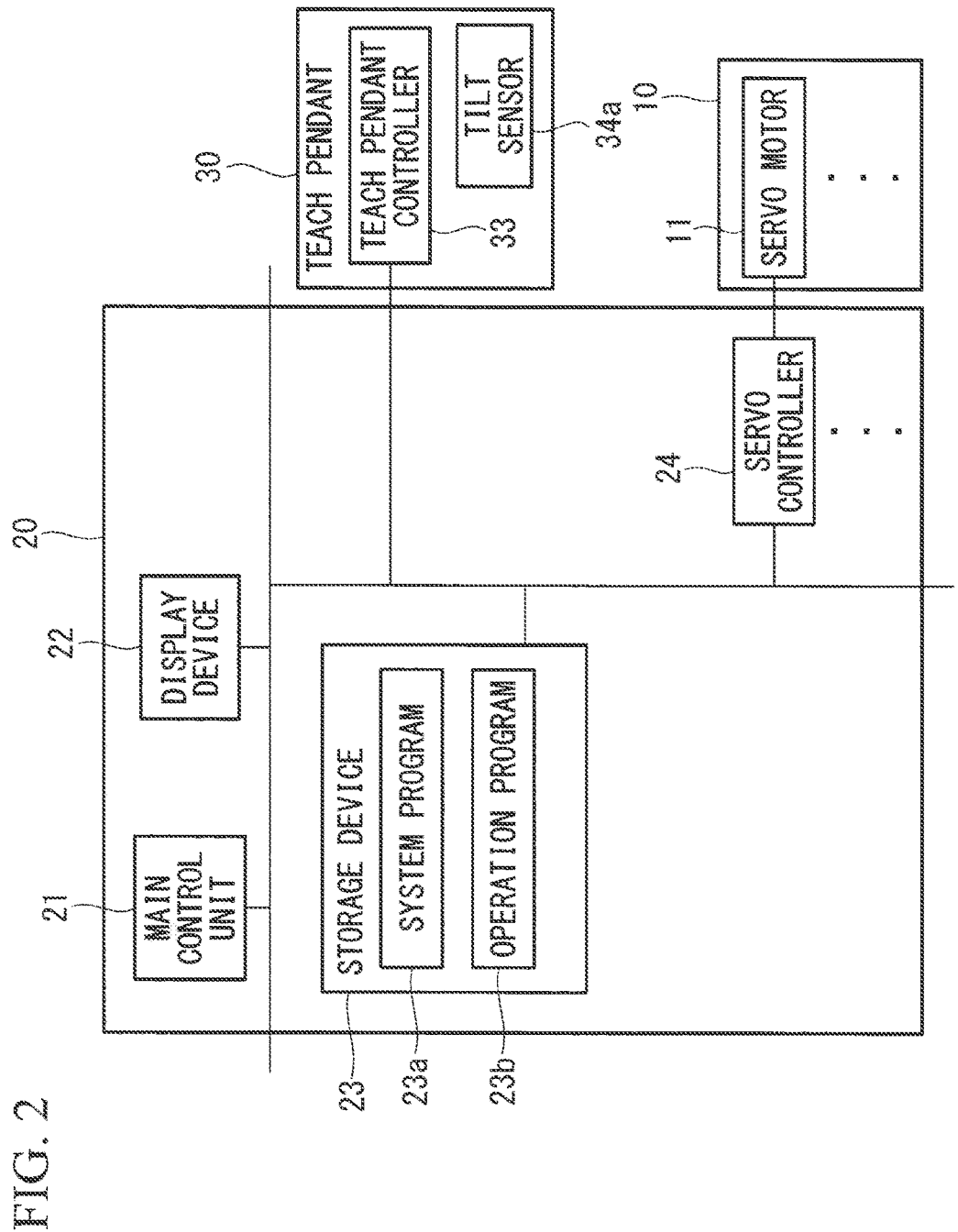
FIG. 2 is a schematic block diagram of the robot system according to the first embodiment.

The robot 10 includes a plurality of movable parts, and also includes a plurality of servo motors 11 for respectively driving the plurality of movable parts (see FIG. 2). Various servo motors including a rotation motor, a liner motor, or the like may be used as each servo motor 11. Each servo motor 11 is provided with an operation position detection device, such as an encoder, for detecting an operation position of the servo motor 11, and a detection value of the operation position detection device is transmitted to the robot control device 20.

For example, the robot control device 20 includes a main control unit 21 including a CPU, a RAM and the like, a display device 22, a storage device 23 including a non-volatile memory, a ROM and the like, the teach pendant 30 to be operated, for example, at the time of creating an operation program for the robot 10, and a plurality of servo controllers 24 provided so as to correspond with the respective servo motors 11 (see FIG. 2).

A system program 23a is stored in the storage device 23, and the system program 23a provides a basic function of the robot control device 20. Furthermore, at least one operation program 23b created by using the teach pendant 30 is stored in the storage device 23. For example, the main control unit 21 of the robot control device 20 operates according to the system program 23a, and reads out, and temporarily stores in the RAM, the operation program 23b stored in the storage device 23, transmits control signals to the servo controllers 24 according to the operation program 23b which has been read out, and thereby controls servo amplifiers of the servo motors 11.

Figure 3:
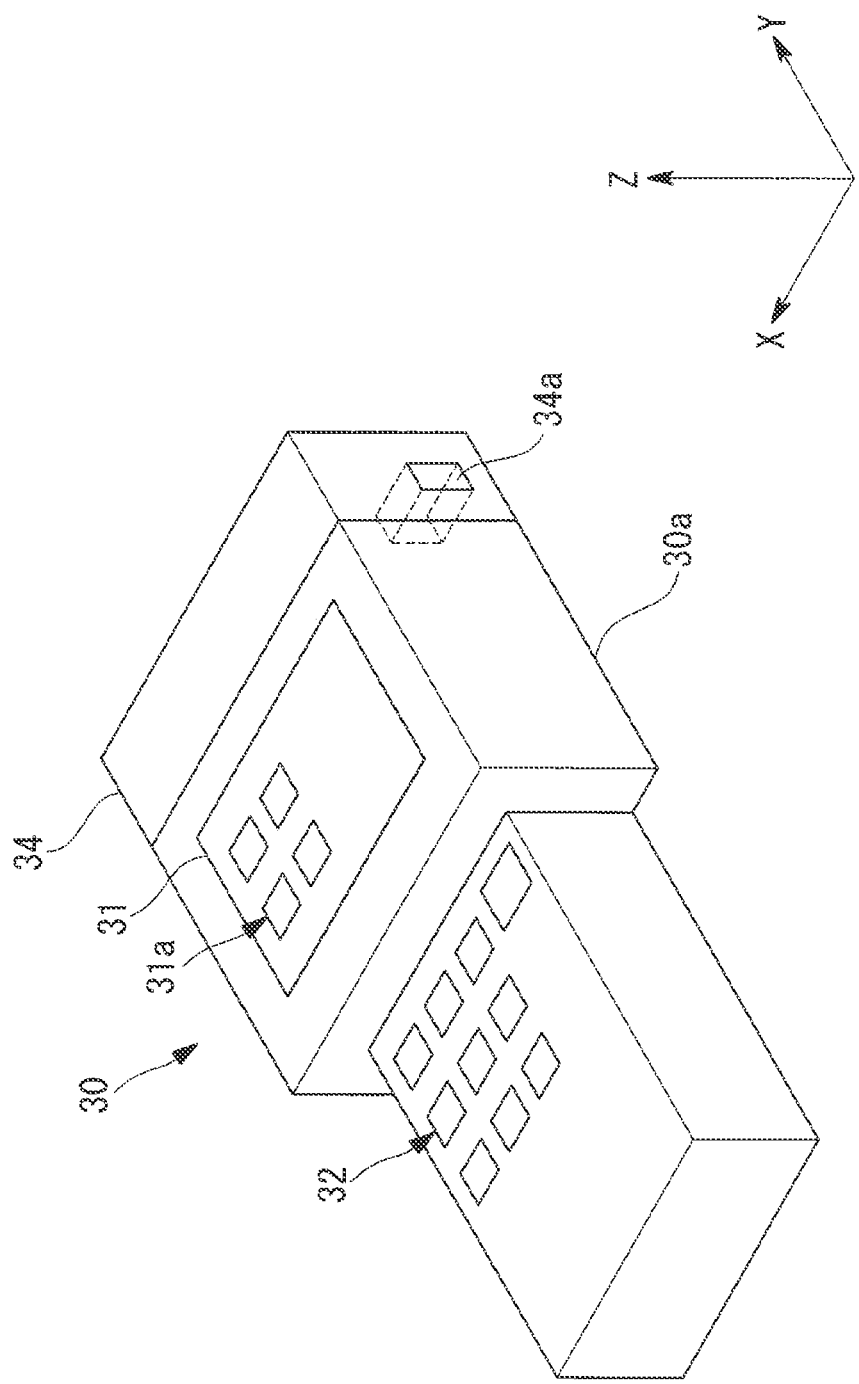
FIG. 3 is a perspective view of a teach pendant of the robot system according to the first embodiment.

As shown in FIG. 3, the teach pendant 30 has functions of a known teach pendant. In the present embodiment, the teach pendant 30 has a display device 31 provided on an upper surface of a housing 30a of the teach pendant 30, a first operation key group 32 provided on the upper surface of the housing 30a and including a plurality of operation keys, a teach pendant controller 33 which is a computer provided inside the housing 30a and including a CPU, a RAM, a storage device and the like, and a program stored in the storage device of the teach pendant controller 33 so as to cause the teach pendant controller 33 to operate in the manner described below. The display device 31 includes a touch screen function.

For example, editing of the operation program 23b stored in the storage device 23 of the robot control device 20, and creation of a new operation program 23b and storage of the operation program 23b in the storage device 23 are performed by operation of a second operation key group 31a including a plurality of operation keys displayed on the display device 31 and the first operation key group 32.

Furthermore, the robot 10 may be manually operated by operation of the second operation key group 31a displayed on the display device 31 and the first operation key group 32. For example, the operation program 23b is edited or newly created by manually causing the robot 10 to operate and by using an operation track of each servo motor 11 at the time or coordinate positions at the time of start and end of operation of each servo motor 11.

A tilt sensor unit 34 is provided in the teach pendant 30, and the tilt sensor unit 34 includes a tilt sensor 34a. The tilt sensor unit 34 has a cuboid shape, for example, and one surface is fixed to a tip surface of the housing 30a of the teach pendant 30, and a surface (tip surface of the tilt sensor unit 34) opposite the aforementioned surface is flat, and is used as a measurement reference surface 34b.

For example, the tilt sensor 34a is a known two-axis tilt sensor for detecting tilt angles around the X-axis and the Z-axis shown in FIG. 3. For example, a tilt sensor can be used, which includes a container containing an electrolyte solution and a plurality of electrodes immersed in the electrolyte solution, and which detects a tilt angle relative to the direction of gravitational force based on a resistance value between each of pairs of electrodes.

Moreover, a tilt sensor can be used, which includes a gyro sensor and an accelerometer, and which determines a reference position of the gyro sensor by using the accelerometer and detects a tilt angle relative to the direction of gravitational force based on displacement of the gyro sensor relative to the reference position.

Moreover, a tilt sensor can be used, which includes a container having an arc-shaped or curved upper wall surface and which is for containing a liquid, and a sensor for detecting a bubble or a sphere in the container and the position of the bubble or the sphere, the tilt sensor being configured to detect a tilt angle relative to the direction of gravitational force based on the position of the bubble or the sphere.

Additionally, the tilt sensor 34a may be provided with a plurality of the tilt sensors described above, and may detect tilt angles around the X-axis and the Z-axis relative to the direction of gravitational force by using the plurality of sensors.

In FIG. 3, the Y-axis is perpendicular to the X-axis and the Z-axis, and the Z-axis is perpendicular to the X-axis and the Y-axis. Furthermore, in FIG. 1, the horizontal axis Y' is perpendicular to the horizontal axis X' and the vertical axis Z' extending in the direction of gravitational force, and the vertical axis Z' is perpendicular to the horizontal axis X' and the horizontal axis Y'. Moreover, the Y-axis is perpendicular to the measurement reference surface 34b.

Figure 4:
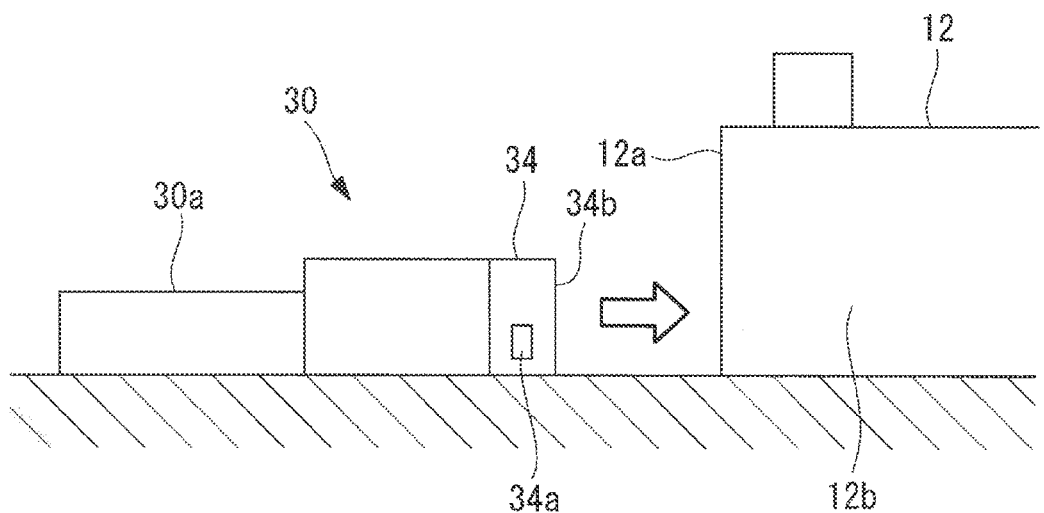
FIG. 4 is an explanatory diagram of an operation of the robot system according to the first embodiment.

For example, as shown in FIGS. 1 and 4, a case will be described where the measurement reference surface 34b is in surface contact with a measured surface 12a, which is a flat surface of a base portion 12 of the robot 10 and which is parallel to the horizontal axis X', and the tilt angle of the measured surface 12a around the horizontal axis X' is determined.

At this time, a sensor control unit provided in the tilt sensor 34a or the teach pendant controller 33 receives a detection value of the tilt angle around the X-axis and a detection value of the tilt angle around the Z-axis from the tilt sensor 34a, and determines the tilt angle of the measured surface 12a around the horizontal axis X' based on both of the received detection values.

A description will be given on a case where the measured surface 12a is tilted by one degree around the horizontal axis X', for example. In this state, if the X-axis of the teach pendant 30 is parallel to the horizontal axis X' in FIG. 1, the tilt angle around the X-axis is detected to be one degree, and the tilt angle around the Z-axis is detected to be zero degrees.

Figure 5:
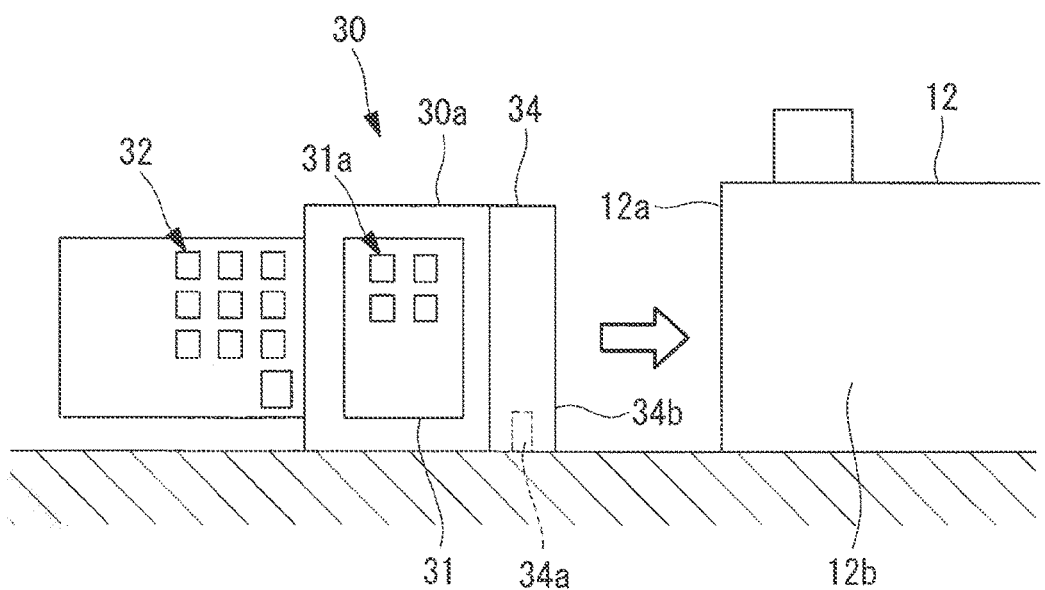
FIG. 5 is an explanatory diagram of an operation of the robot system according to the first embodiment.

On the other hand, as shown in FIG. 5, when the teach pendant 30 is rotated 90 degrees around the Y-axis, and then, the measurement reference surface 34b is brought into surface contact with the measured surface 12a, the tilt angle around the X-axis is detected to be zero degrees, and the tilt angle around the Z-axis is detected to be one degree.

Between the two positions described above, the detection values of the tilt angle around the X-axis and the tilt angle around the Z-axis each take a value between zero degrees and one degree. The tilt angle of the measured surface 12a around the horizontal axis X' can thus be determined based on both of the received detection values.

Meanwhile, when a predetermined input is received from the first operation key group 32 or the second operation key group 31a, which are each an input unit, the teach pendant controller 33 outputs data (based on the detection values of the tilt sensor 34a) indicating the tilt angle around the horizontal axis X' determined at the time to the robot control device 20. At this time, an operator performs the predetermined input while checking that tilt measurement is performed in a state where the measurement reference surface 34b is in surface contact with the measured surface 12a, based on the feeling in the hand holding the teach pendant 30 or by visual check, for example.

In the case described above, the tilt angle of the measured surface 12a of the base portion 12 is detected, but the tilt angle of a measured surface 12b, of the base portion 12, orthogonal to the measured surface 12a may also be detected. In this case, the method of determining the tilt angle of the measured surface 12b around the horizontal axis Y' by the teach pendant 30, and the method of outputting data indicating the tilt angle to the robot control device 20 are the same as those in the case of the measured surface 12a. Moreover, a flat measured surface may be provided at various parts other than the base portion 12 of the robot 10, and the tilt angle of the measured surface around the horizontal axis may be determined by the same method as the method described above, and data indicating the tilt angle may be output to the robot control device 20 by the same method as the method described above.

For example, the robot control device 20 calculates a deflection occurring at each movable part and each link of the robot 10 by Newton-Euler method or the like and by using data indicating the tilt angle received from the teach pendant controller 33, and then, calculates a deviation of the position or the posture of the tip of the robot 10 from a target position based on the determined deflections, and controls operation of each servo motor 11 such that the deviation is corrected.

Here, when the determined tilt angle is associated with the tilt angle measurement position for which the tilt angle was determined, calculation of the deflection at the robot control device 20 may be performed with a higher accuracy. Accordingly, in the present embodiment, at the time of output, or before or after the output, of data indicating the tilt angle to the robot control device 20 by the teach pendant controller 33, data indicating the tilt angle measurement position is output to the robot control device 20 so as to allow association of the tilt angle measurement position with the data indicating the tilt angle.

Data indicating the tilt angle measurement position is based on input to the first operation key group 32 or the second operation key group 31a, which are each an input unit, for example. Alternatively, the teach pendant 30 may include a reading device for reading information of an identifier, such as an ID tag or a two-dimensional code, provided at the tilt angle measurement position of the robot 10, and information read out by the reading device may be output as the data indicating the tilt angle measurement position.

According to the present embodiment, the tilt sensor 34a and the measurement reference surface 34b are provided at the teach pendant 30, and when the measurement reference surface 34b of the teach pendant 30 is brought into surface contact with the measured surface 12a, 12b of the robot 10, and a predetermined input is performed to the first operation key group 32 or the second operation key group 31a, data based on detection values of the tilt sensor 34a is transmitted to the robot control device 20. Therefore, a measurement result regarding a tilt of the robot 10 is easily and accurately input to the control device for the robot.

Figure 6:
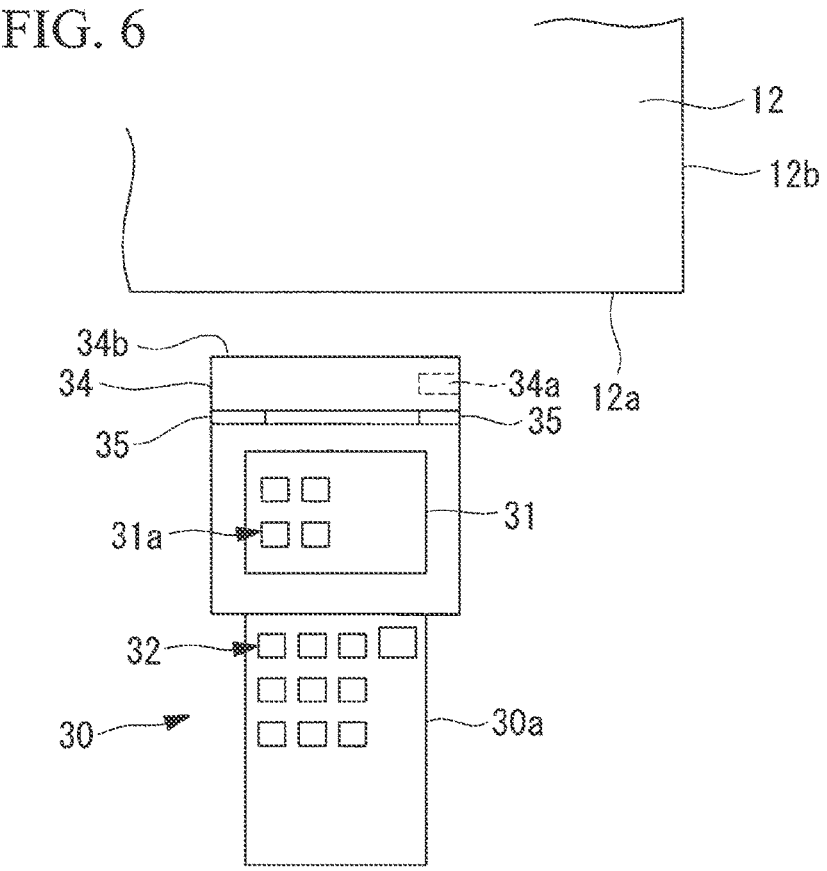
FIG. 6 is a plan view of a teach pendant of a robot system of a first modification of the first embodiment.
Figure 7:
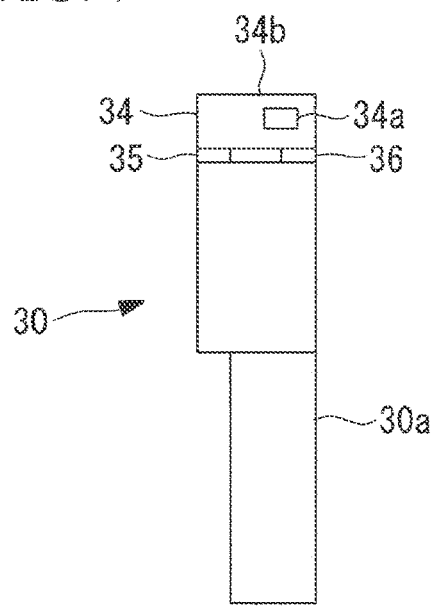
FIG. 7 is a side view of the teach pendant of the robot system showing the first modification of the first embodiment.

Additionally, as shown in FIGS. 6 and 7, a plurality of force sensors 35, 36 for detecting a distribution of forces acting on the measurement reference surface 34b may be provided. In FIGS. 6 and 7, a pair of force sensors 35 disposed in the X-axis direction with a gap between the sensors is disposed between the tip surface of the housing 30a of the teach pendant 30 and the tilt sensor unit 34, on one end side in the Z-axis direction, and a pair of force sensors 36 disposed in the X-axis direction with a gap between the sensors is disposed between the tip surface of the housing 30a of the teach pendant 30 and the tilt sensor unit 34, on the other end side in the Z-axis direction.

In this case, when the detection values of the force sensors 35, 36 reach or exceed a predetermined value, and a difference between the detection values of the force sensors 35, 36 reaches or falls below a predetermined value, and the distribution of forces acting on the measurement reference surface 34b thereby falls within a predetermined reference range, data based on the detection values of the tilt sensor 34a at that time is output from the teach pendant controller 33 to the robot control device 20. When using such a configuration, surface contact between the measurement reference surface 34b and the measured surface 12a, 12b is easily and reliably detected based on the distribution of forces.

Figure 8:
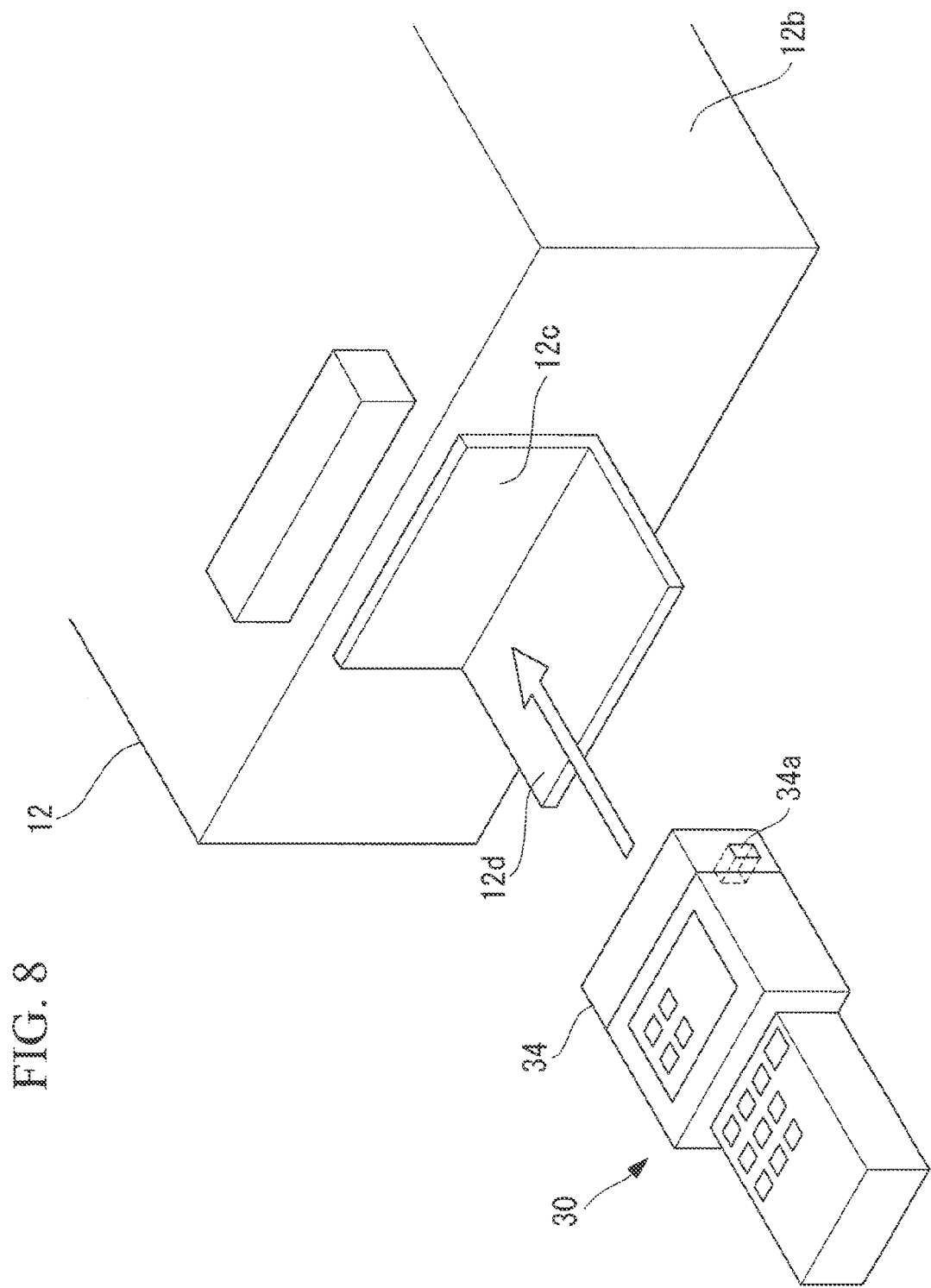
FIG. 8 is a perspective view of main parts of a robot system of a second modification of the first embodiment.

In the present embodiment, the tilt sensor 34a is indicated to be a two-axis tilt sensor. However, the tilt sensor 34a may alternatively be a one-axis tilt sensor which detects only the tilt angle around the X-axis, for example. In this case, as shown in FIG. 8, the robot 10 is provided with a rotation restriction portion 12d which is provided near a measured surface 12c provided on the base portion 12 or another part of the robot 10, and which protrudes in a substantially perpendicular direction with respect to the measured surface 12c.

Figure 9:
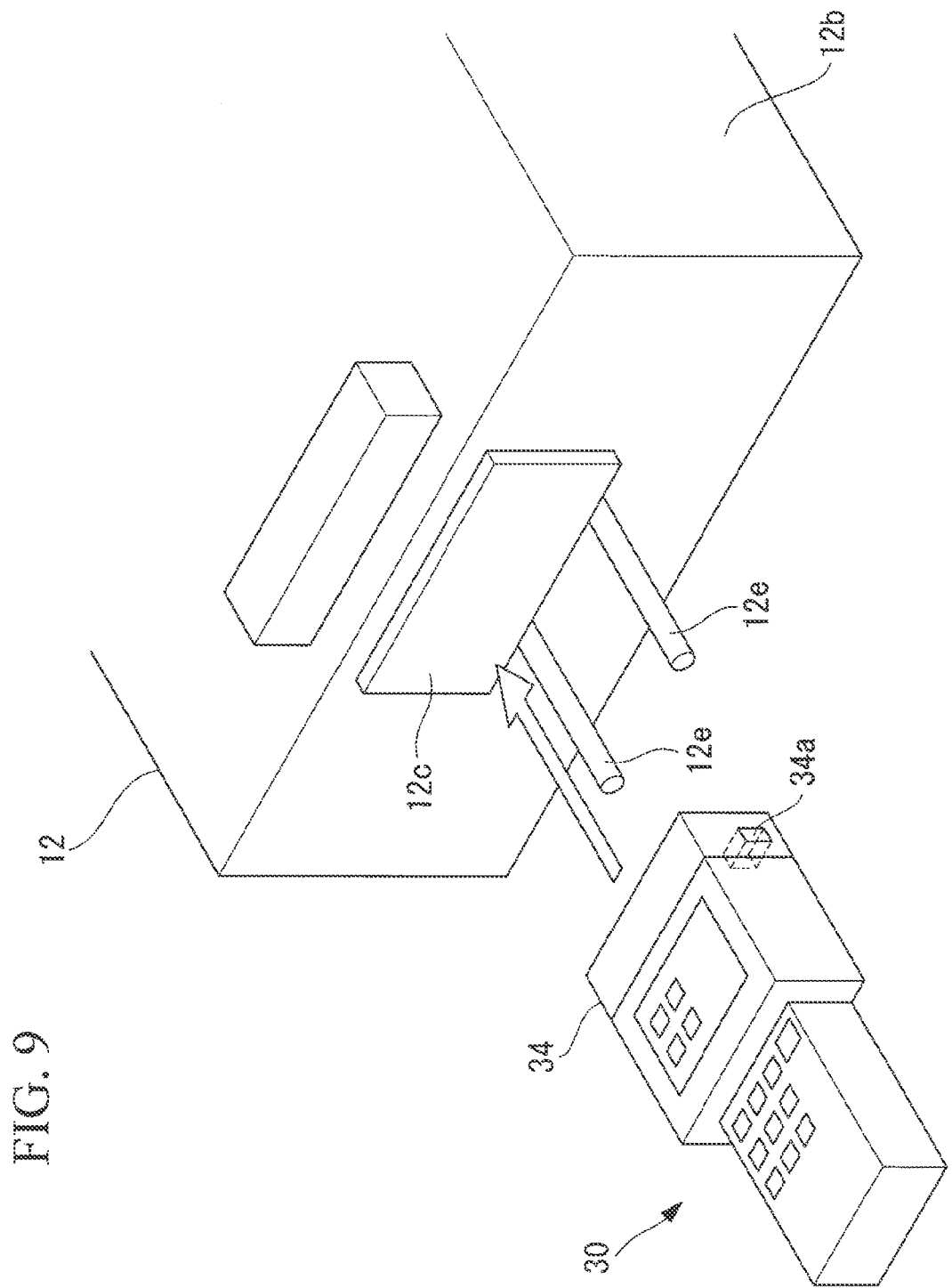
FIG. 9 is a perspective view of main parts of a robot system of a third modification of the first embodiment.

Additionally, the rotation restriction portion 12d is configured such that, when at least a part of a lower surface of the teach pendant 30 comes into surface contact or line contact with an upper surface of the rotation restriction portion 12d, the X-axis of the teach pendant 30 extends along the horizontal direction. As long as the function is achieved, rotation restriction portions 12e, which are a plurality of bar-shaped members provided with a gap therebetween in the horizontal direction, may be provided instead, as shown in FIG. 9. According to such a configuration, the tilt angle of the measured surface 12c may be accurately detected even if the tilt sensor 34a is a one-axis tilt sensor.

Figure 10:
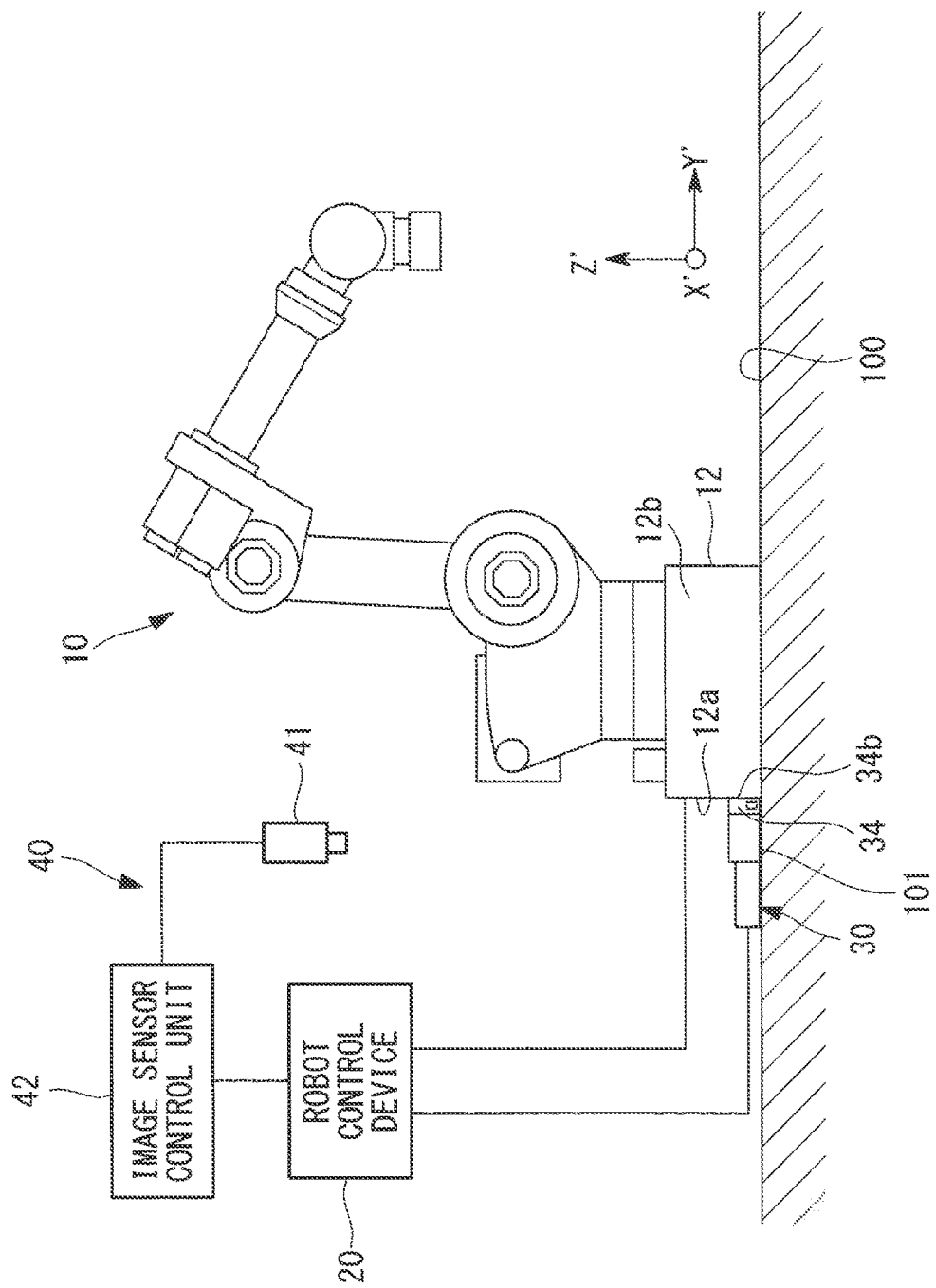
FIG. 10 is a schematic side view of a robot system of a fourth modification of the first embodiment.

Alternatively, as shown in FIG. 10, an image sensor 40 for detecting a rotation position of the teach pendant 30 around the Y-axis may be provided, and the robot control device 20 may calculate the tilt of a measured surface by using a detection result of the image sensor 40 and data based on a detection value output from the teach pendant controller 33.

In this case, the image sensor 40 includes an imaging device 41 for capturing from above an image of the teach pendant 30 which is in contact with a measured surface, an image sensor control unit 42 connected to the imaging device 41 and including a CPU, a RAM, a storage device and the like, and a program, stored in the storage device of the image sensor control unit 42, for causing the image sensor control unit 42 to operate in the following manner.

The image sensor control unit 42 performs image processing of performing image processing on image data from the imaging device 41 and generating processed data in which the contour of the entire upper surface of the teach pendant 30, the contour of the upper surface of a reference portion or the like is emphasized, and an output process of calculating a rotation position (angle between the X-axis and the horizontal axis X') of the teach pendant 30 around the Y-axis based on the processed data, and outputting the calculation result to the robot control device 20.

For example, the angle between the X-axis of the teach pendant 30 and the horizontal axis X' is calculated by determining the X-axis direction of the teach pendant 30 in the processed data and determining a maximum dimension of the contour of the entire upper surface of the teach pendant 30 in the X-axis direction, and comparing the maximum dimension with a reference dimension (such as a maximum dimension in the X-axis direction when the angle between the X-axis and the horizontal axis X' is zero degrees).

Accordingly, even if the tilt sensor 34a is a one-axis tilt sensor which detects only the tilt angle around the X-axis, for example, and the rotation restriction portion(s) 12d, 12e is/are not provided, the tilt angle of a measured surface may be accurately measured.

Additionally, in a case where a two-axis tilt sensor is adopted as the tilt sensor 34a, if the rotation restriction portion(s) 12d, 12e is/are provided, the posture of the teach pendant 30 is stabilized, and this is advantageous in accurately measuring the tilt angle of a measured surface.

Furthermore, when the image sensor 40 is provided, data based on the detection value of the tilt sensor 34a may be corrected based on a rotation position of the teach pendant 30 around the Y-axis also when a two-axis tilt sensor is adopted as the tilt sensor 34a, and this is advantageous in accurately measuring the tilt angle of a measured surface.

A robot system according to a second embodiment of the present invention will be described with reference to the drawings.

Figure 11:
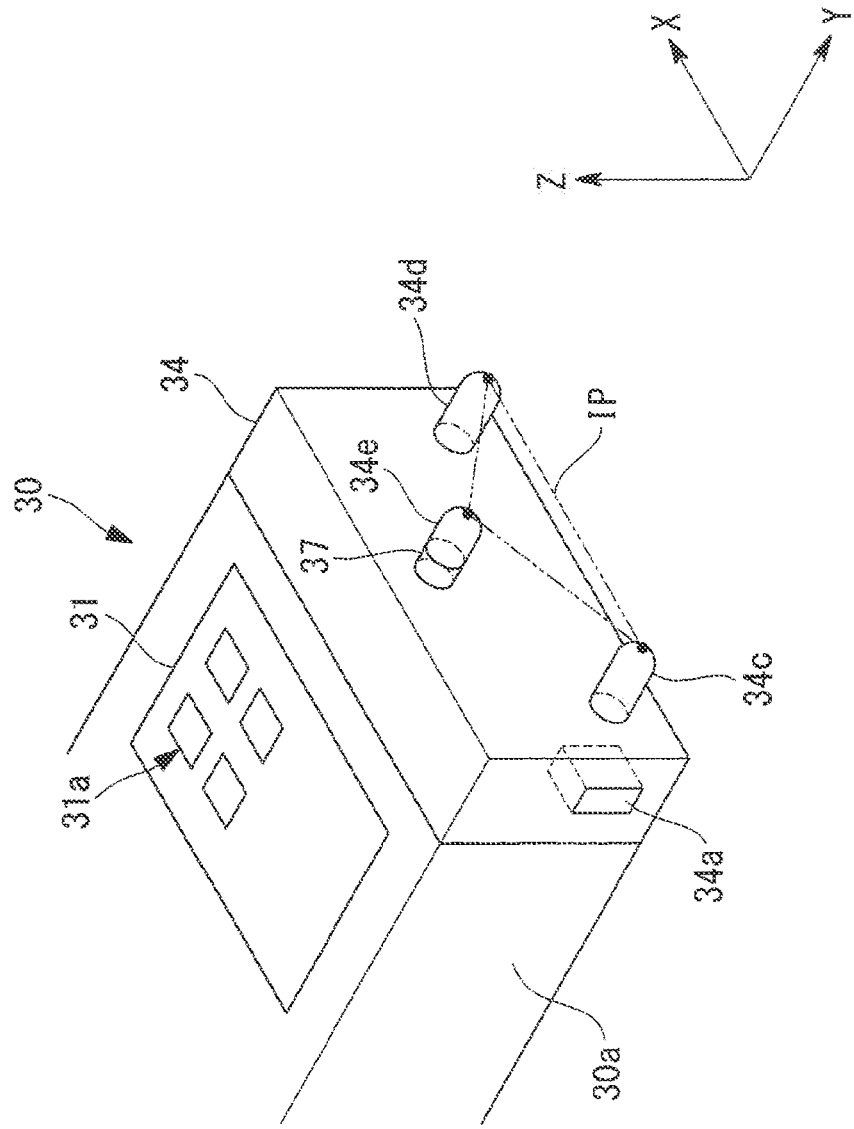
FIG. 11 is a perspective view of main parts of a teach pendant of a robot system according to a second embodiment of the present invention.

As shown in FIG. 11, in the second embodiment, the measurement reference surface 34b in the first embodiment is replaced by a plurality of measurement reference protrusions 34c, 34d, 34e. In the second embodiment, structural elements the same as those in the first embodiment are denoted by the same reference signs, and description thereof is omitted.

In the second embodiment, three measurement reference protrusions 34c, 34d, 34e protrude from the tip surface of the tilt sensor unit 34. In this case, the Y-axis of the teach pendant 30 is arranged to be perpendicular to a measurement reference virtual surface IP including tips of the three measurement reference protrusions 34c, 34d, 34e.

The measurement reference protrusions 34c, 34d are disposed with a gap therebetween in the X-axis direction, and are disposed on the tip surface of the tilt sensor unit 34, on one end side in the Z-axis direction. The measurement reference protrusion 34e is disposed at a position between the measurement reference protrusion 34c and the measurement reference protrusion 34d in the X-axis direction, and is disposed on the tip surface of the tilt sensor unit 34, on the other end side in the Z-axis direction. Additionally, four or more measurement reference protrusions may alternatively be provided.

In the present embodiment, instead of checking that tilt measurement is performed in a state where the measurement reference surface 34b is in surface contact with the measured surface 12a of the base portion 12, as in the first embodiment, tilt measurement is checked to be performed in a state where each of the measurement reference protrusions 34c, 34d, 34e is in contact with the measured surface 12a, and predetermined input is performed to the first operation key group 32 or the second operation key group 31a as in the first embodiment. Data indicating the tilt angle is thus output to the robot control device 20 in the same manner as in the first embodiment.

Additionally, also in the second embodiment, a force sensor 37 may be provided on a proximal end side of the measurement reference protrusion 34e. In this case, in contrast to the first embodiment where data based on a detection value is output to the robot control device 20 when the distribution of forces acting on the measurement reference surface 34b fell within a predetermined reference range, data based on a detection value of the tilt sensor 34a at the time of detection, by the force sensor 37 of the measurement reference protrusion 34e, of a force greater than predetermined magnitude is output from the teach pendant controller 33 to the robot control device 20. The force sensor 37 may also be provided on the measurement reference protrusions 34c, 34d.

Figure 12:
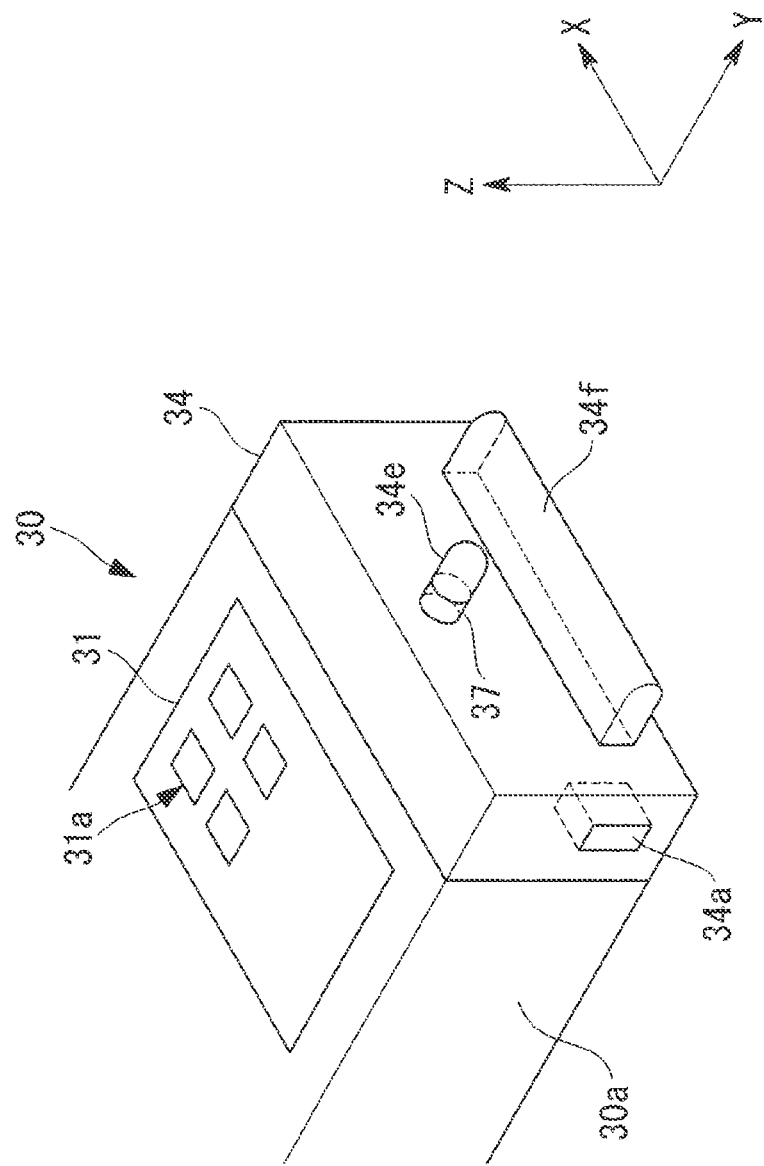
FIG. 12 is a perspective view of main parts of a teach pendant of a first modification of the second embodiment.

Additionally, as shown in FIG. 12, the measurement reference protrusions 34c, 34d may be changed to a measurement reference protrusion 34f which extends in the X-axis direction. Also in this case, the same effects are achieved as in the case of providing the measurement reference protrusions 34c, 34d.

Figure 13:
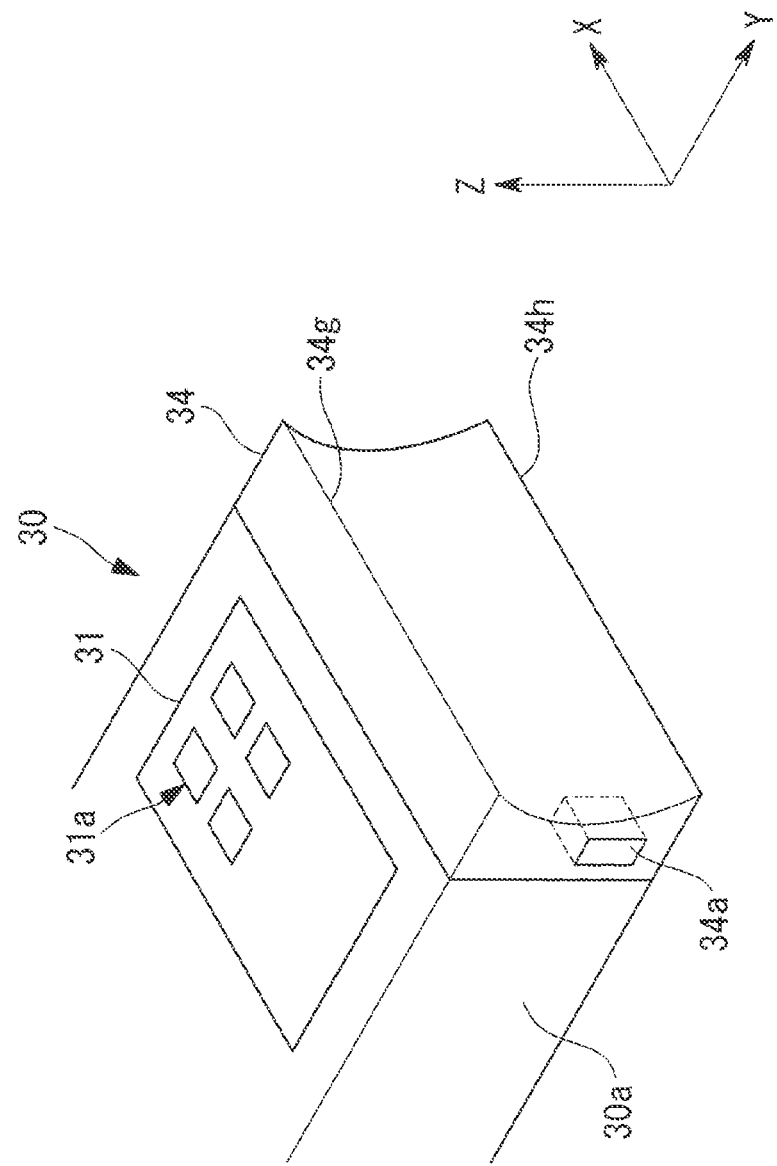
FIG. 13 is a perspective view of main parts of a teach pendant of a second modification of the second embodiment.

Moreover, as shown in FIG. 13, a plurality of measurement reference protrusions 34g, 34h may be provided on the tip surface of the tilt sensor unit 34, with a gap therebetween in a vertical direction (Z-axis direction). In FIG. 13, each of the measurement reference protrusions 34g, 34h extends in a width direction (X-axis direction), and protrudes forward (Y-axis direction) from the tip surface of the tilt sensor unit 34. One or both of the measurement reference protrusions 34g, 34h may be provided with a force sensor. Also in this case, the same effects are achieved as in the case of providing the measurement reference protrusions 34c, 34d.

Additionally, in the first and second embodiments, the teach pendant controller 33 as an output means outputs data indicating a tilt angle to the robot control device 20, but a sensor control unit provided in the tilt sensor 34a may alternatively serve as an output means for outputting data indicating a tilt angle to the robot control device 20.

Furthermore, in the first and second embodiments, data indicating a tilt angle is output to the robot control device 20, but a detection value around the X-axis and/or a detection value around the Z-axis detected by the tilt sensor 34a may alternatively be output to the robot control device 20.

Moreover, in the first and second embodiments, the tilt sensor unit 34 is fixed on the tip surface of the housing 30a of the teach pendant 30, but the tilt sensor unit 34 may be fixed to other than the tip surface of the housing 30a. The tilt sensor unit 34 may be partially disposed inside the housing 30a.

Moreover, in the first and second embodiments, the teach pendant 30 may be a portable computer such as a tablet terminal. In this case, the teach pendant 30 includes same functions as a normal computer.

Figure 14:
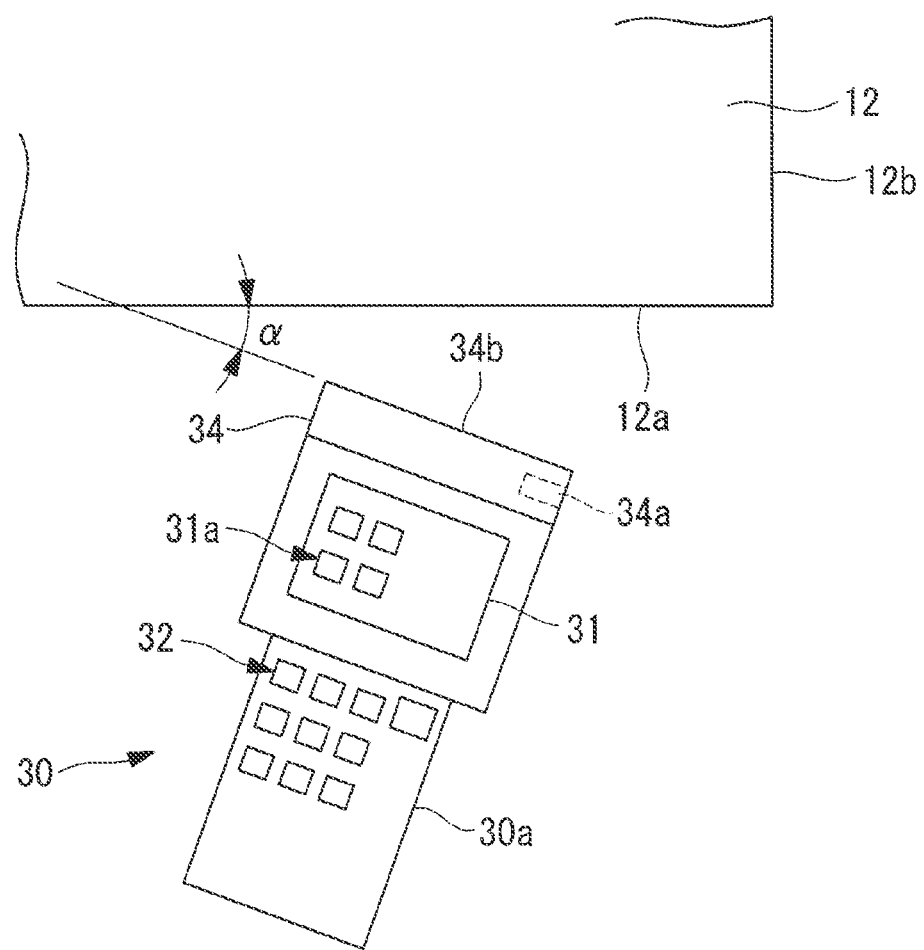
FIG. 14 is a schematic plan view of a robot system of a fifth modification of the first embodiment.

Additionally, in the first and second embodiments, the image sensor 40 may be provided above the teach pendant 30, as shown in FIG. 10, and an angle α (see FIG. 14) formed by the measurement reference surface 34b of the teach pendant 30 and, for example, the measured surface 12a of the base portion 12 of the robot 10 may be determined by the robot control device 20 based on a detection result of the image sensor 40, and a tilt of the measured surface may be calculated by the robot control device 20 by using the angle α and data based on a detection value output from the teach pendant controller 33.

In this case, as shown in FIG. 10, the teach pendant 30 is placed on a measured surface 101 on an installation surface 100 of the robot 10, and the tilt sensor 34a detects the tilt in a state where the lower surface of the teach pendant 30 is in surface contact with the measured surface 101. Accordingly, the lower surface of the teach pendant 30 functions as a measurement reference surface, and the measurement reference surface 34b of the teach pendant 30 and the measured surface 12a of the base portion 12 of the robot 10 function as a measurement reference surface and a measured surface (second measurement reference surface and second measured surface) for detecting a rotation position of the teach pendant 30 around the Z-axis.

Additionally, the teach pendant 30 may be placed on a measured surface which is provided on the robot 10 in a manner facing upward, and the lower surface of the teach pendant 30 may be brought into surface contact with the measured surface of the robot 10.

According to this configuration, a tilt of the robot 10 is calculated by using the angle α, in a plan view, formed by the measurement reference surface 34b of the teach pendant 30 and the measured surface 12a of the robot 10 and a detection value or data based on the detection value output from the teach pendant 30, and thus, a tilt of the robot 10 may be measured simply by placing the teach pendant 30 on the robot 10 or on the installation surface 100, without causing the teach pendant 30 to come into contact with the robot 10 in the horizontal direction.

Additionally, the teach pendant 30 may be configured such that, when the teach pendant 30 is placed on the measured surface 101 on the installation surface 100 of the robot 10, detection by the tilt sensor 34a is performed in a state where a plurality of protrusions formed on the lower surface of the teach pendant 30 are in contact with the measured surface 101.

The inventors have arrived at the following aspects of the present invention.

A teach pendant according to a first aspect of the present invention is a teach pendant including an input unit and allowing teaching of operation of a robot by an input to the input unit, the teach pendant including a measurement reference surface which comes into surface contact with a measured surface of the robot; a tilt sensor whose position is fixed with respect to the measurement reference surface; and an output means which outputs a detection value of the tilt sensor or data based on the detection value to a control device of the robot in a state where the measurement reference surface is in surface contact with the measured surface and when a predetermined input is performed on the input unit or a contact detection sensor for detecting the surface contact between the measurement reference surface and the measured surface detects the surface contact.

In this aspect, the measurement reference surface and the tilt sensor are provided in the teach pendant, and when the measurement reference surface of the teach pendant is brought into surface contact with the measured surface of the robot, and a predetermined input is performed on the input unit or the surface contact is detected by the contact detection sensor for detecting surface contact, a detection value of the tilt sensor or data based on the detection value is transmitted to the control device of the robot. Therefore, a measurement result regarding a tilt of the robot is easily and accurately input to the control device of the robot.

In the first aspect, the contact detection sensor may be configured to detect the surface contact based on a distribution of force acting on the measurement reference surface. For example, the contact detection sensor may be configured such that surface contact is not detected when force acting on the measurement reference surface is unevenly distributed, and such that surface contact is detected when evenness of force acting on the measurement reference surface is higher than a reference value. Surface contact may thereby be easily and reliably detected.

A teach pendant according to a second aspect of the present invention is a teach pendant including an input unit and allowing teaching of operation of a robot by an input to the input unit, the teach pendant including a plurality of measurement reference protrusions which come into contact with a measured surface of the robot; a tilt sensor whose position is fixed with respect to the plurality of measurement reference protrusions; and an output means which outputs a detection value of the tilt sensor or data based on the detection value to a control device of the robot in a state where the plurality of measurement reference protrusions are in contact with the measured surface and when a predetermined input is performed on the input unit or a contact detection sensor for detecting the contact between the plurality of measurement reference protrusions and the measured surface detects the contact.

In this aspect, the plurality of measurement reference protrusions and the tilt sensor are provided in the teach pendant, and when the plurality of measurement reference protrusions of the teach pendant are brought into contact with the measured surface of the robot, and a predetermined input is performed to the input unit or the contact is detected by the contact detection sensor for detecting the contact between the measurement reference protrusions and the measured surface, a detection value of the tilt sensor or data based on the detection value is transmitted to the control device of the robot. Therefore, a measurement result regarding a tilt of the robot is easily and accurately input to the control device of the robot.

In the second aspect, the contact detection sensor may detect force acting on at least one of the plurality of measurement reference protrusions, and may detect the contact when a force of predetermined magnitude or more is applied to the at least one measurement reference protrusion.

For example, in a case where three measurement reference protrusions are provided, and a force acting on one of the measurement reference protrusions is to be detected by the contact detection sensor, if the one measurement reference protrusion for which the force is to be detected by the contact detection sensor is pressed against the measured surface after the two measurement reference protrusions for which the forces are not to be detected by the contact detection sensor are, for example, visually confirmed to have come into contact with the measured surface, the detection value of the tilt sensor or data based on the detection value is output to the control device of the robot. In this manner, the surface contact may be easily and reliably detected, and the time required for output of a detection value of the tilt sensor or data based on the detection value to the control device of the robot may be reduced.

A robot system according to a third aspect of the present invention includes one of the aforementioned teach pendants; the measured surface provided on at least one of a base portion and a movable part of the robot; the control device which receives the detection value or the data based on the detection value output from the teach pendant; and a rotation restriction portion which restricts rotation of the teach pendant around an axis line perpendicular to the measured surface when the teach pendant is in surface contact or contact with the measured surface.

In the third aspect, an image sensor which detects a rotation position of the teach pendant around an axis line perpendicular to the measurement reference surface may be included, where the control device calculates a tilt of the robot by using the rotation position of the teach pendant detected by the image sensor and the detection value or the data based on the detection value output from the teach pendant. The measurement accuracy of a tilt of the robot may thereby be increased.

A robot system according to a fourth aspect of the present invention includes one of the aforementioned teach pendant; the measured surface which face upward and which is provided on the robot or an installation surface of the robot; an image sensor which detects an angle, in a plan view, formed by a second measurement reference surface of the teach pendant and a second measured surface of the robot in a state where the teach pendant is mounted on the measured surface in such a way that the measurement reference surface is in surface contact with the measured surface or the plurality of measurement reference protrusions are in contact with the measured surface; and the control device of the robot which calculates a tilt of the robot by using a detection angle of the image sensor and the detection value or the data based on the detection value output from the teach pendant.

According to this configuration, a tilt of the robot is calculated by using an angle, in a plan view, formed by the second measurement reference surface of the teach pendant and the second measured surface of the robot and a detection value or data based on the detection value output from the teach pendant, and thus, a tilt of the robot may be measured simply by placing the teach pendant on the robot or on the installation surface of the robot, without causing the teach pendant to come into contact with the robot in the horizontal direction.

According to the aforementioned aspects, a measurement result of a tilt of a robot can be easily and accurately used for control of the robot.

The invention claimed is:

1. A teach pendant including an input unit and allowing teaching of operation of a robot by an input to the input unit, the teach pendant comprising:
a measurement reference surface which comes into surface contact with a measured surface of the robot;
a tilt sensor whose position is fixed with respect to the measurement reference surface; and
a teach pendant controller,
wherein the teach pendant controller is configured to output a detection value of the tilt sensor or data based on the detection value to a control device of the robot in a state where the measurement reference surface is in surface contact with the measured surface and when a predetermined input is performed on the input unit or a contact detection sensor for detecting the surface contact between the measurement reference surface and the measured surface detects the surface contact.

2. The teach pendant according to claim 1, wherein the contact detection sensor detects the surface contact based on a distribution of force acting on the measurement reference surface.

3. A robot system comprising:
the teach pendant according to claim 1;
the measured surface provided on at least one of a base portion and a movable part of the robot;
the control device which receives the detection value or the data based on the detection value output from the teach pendant; and
a rotation restriction portion which restricts rotation of the teach pendant around an axis line perpendicular to the measured surface when the teach pendant is in surface contact or contact with the measured surface.

4. The robot system according to claim 1, further comprising an image sensor which detects a rotation position of the teach pendant around an axis line perpendicular to the measurement reference surface,
wherein the control device calculates a tilt of the robot by using the rotation position of the teach pendant detected by the image sensor and the detection value or the data based on the detection value output from the teach pendant.

5. A robot system comprising:
the teach pendant according to claim 1;
the measured surface, wherein the measured surface faces upward and which is provided on the robot or an installation surface of the robot, the robot system further comprises:
an image sensor which detects from an upper side of the teach pendant, an angle, in a plan view, formed by a second measurement reference surface of the teach pendant located at one end in a horizontal direction of the teach pendant and a second measured surface that is a side surface of the robot in a state where the teach pendant is mounted on the measured surface in such a way that the measurement reference surface that is a lower surface of the teach pendant is in surface contact with the measured surface; and
the control device of the robot, wherein the control device of the robot calculates a tilt of the robot by using a detection angle of the image sensor and the detection value or the data based on the detection value output from the teach pendant.

6. A teach pendant including an input unit and allowing teaching of operation of a robot by an input to the input unit, the teach pendant comprising:
a plurality of measurement reference protrusions which come into contact with a measured surface of the robot;
a tilt sensor whose position is fixed with respect to the plurality of measurement reference protrusions; and
a teach pendant controller,
wherein the teach pendant controller is configured to output a detection value of the tilt sensor or data based on the detection value to a control device of the robot in a state where the plurality of measurement reference protrusions are in contact with the measured surface and when a predetermined input is performed on the input unit or a contact detection sensor for detecting the contact between the plurality of measurement reference protrusions and the measured surface detects the contact.

7. The teach pendant according to claim 6, wherein the contact detection sensor detects force acting on at least one of the plurality of measurement reference protrusions, and detects the contact when a force of predetermined magnitude or more is applied to the at least one measurement reference protrusion.

8. The robot system according to claim 6, further comprising an image sensor which detects a rotation position of the teach pendant around an axis line perpendicular to a measurement reference virtual surface including tips of the plurality of measurement reference protrusions,
wherein the control device calculates a tilt of the robot by using the rotation position of the teach pendant detected by the image sensor and the detection value or the data based on the detection value output from the teach pendant.

9. A robot system comprising:
the teach pendant according to claim 6;
the measured surface, wherein the measured surface faces upward and which is provided on the robot or an installation surface of the robot;
an image sensor which detects from an upper side of the teach pendant, an angle, in a plan view, formed by a second measurement reference surface of the teach pendant located at one end in a horizontal direction of the teach pendant and a second measured surface that is a side surface of the robot in a state where the teach pendant is mounted on the measured surface in such a way that the plurality of measurement reference protrusions that are formed on the lower surface of the teach pendant are in contact with the measured surface; and the control device of the robot, wherein the control device of the robot calculates a tilt of the robot by using a detection angle of the image sensor and the detection value or the data based on the detection value output from the teach pendant.

\* \* \* \* \*